April 28, 1964   C. BAUR ETAL   3,130,658
DIAPHRAGM OPERATING STRUCTURE FOR CAMERAS
Filed April 15, 1959   5 Sheets-Sheet 1

INVENTORS
CARL BAUR
ERICH BURGER
BY
Michael S. Striker
Attorney

April 28, 1964  C. BAUR ETAL  3,130,658
DIAPHRAGM OPERATING STRUCTURE FOR CAMERAS
Filed April 15, 1959  5 Sheets-Sheet 2

INVENTORS
CARL BAUR
ERICH BURGER
BY
Michael S. Strikes
Attorney

April 28, 1964     C. BAUR ETAL     3,130,658
DIAPHRAGM OPERATING STRUCTURE FOR CAMERAS
Filed April 15, 1959     5 Sheets-Sheet 4

INVENTORS
CARL BAUR
ERICH BURGER
BY

United States Patent Office 3,130,658
Patented Apr. 28, 1964

3,130,658
DIAPHRAGM OPERATING STRUCTURE
FOR CAMERAS
Carl Baur, Munich-Baldham, and Erich Burger, Munich-Unterhaching, Germany, assignors to Agfa Aktiengesellschaft, Leverkusen-Bayerwerk, Germany
Filed Apr. 15, 1959, Ser. No. 806,544
Claims priority, application Germany Apr. 24, 1958
12 Claims. (Cl. 95—10)

The present invention relates to cameras.

More particularly, the present invention relates to reflex cameras and especially to single-lens reflex cameras wherein a reflector is tiltable between one position where it directs an image up to the view finder and another position where it is out of the path of the light rays which extend through the objective to the focal plane.

In cameras of this latter type considerable difficulty is encountered in connection with the operation of the diaphragm. Thus, while viewing the subject through the same objective which is used for making an exposure, it is necessary that the diaphragm be fully opened so as not to obstruct the view of the subject. On the other hand, when the exposure is to be made, it is necessary that the diaphragm be set at such a setting that in connection with the setting of the exposure time the proper amount of light will reach the film so as to provide the best possible exposure. Thus, it is necessary with cameras of this type to provide a diaphragm which is fully open during viewing of the subject and which can be set at its proper aperture size just before the exposure is made, and when it is remembered that this setting of the diaphragm must take place in an extremely short period of time during which the tiltable reflector moves out of the way of the light rays which pass through the objective, then it is clear that considerable difficulties are indeed involved in the structure which controls the diaphragm of such a camera.

One of the objects of the present invention is to provide a camera of the above type with an exceedingly reliable means which will operate the diaphragm so as to reliably set the same at a preselected value just before the exposure is made and in a fully automatic manner.

Another object of the present invention is to provide a diaphragm operating structure of the above type which receives its drive entirely from structure located in the camera housing, so that it is unnecessary to locate any driving structure in the objective assembly where the diaphragm itself is located.

A further object of the present invention is to provide a structure of the above type which includes a depth of field indicator forming part of the objective assembly and operated automatically during preselection of the diaphragm setting.

It is also an object of the present invention to provide an exceedingly simple drive structure located in the housing of the camera and operating elements of the objective assembly so as to operate the diaphragm setting structure as well as the depth of field indicator in an efficient, reliable manner.

It is a particular object of the present invention to provide a drive structure of the above type which will reliably enable either extremely short or relatively long exposures to be made irrespective of the manner in which a manually operable release plunger of the camera is manipulated by the operator.

It is also an object of the present invention to provide diaphragm operating structures of the above type capable of being coupled or uncoupled with exposure time setting devices so that, if desired, the exposure time may be set simultaneously with the preselection of the aperture of the diaphragm.

With the above objects in view, the present invention includes in a camera a camera housing and an objective assembly carried by the housing, a diaphragm forming part of this objective assembly. A preselecting means also forms part of the objective assembly and serves the purpose of preselecting a setting of the diaphragm. A moving means also forms part of the objective assembly and cooperates with the diaphragm to move the latter to the setting preselected by the preselecting means. An operating means is carried by the camera housing and is connected to the moving means for operating the latter to set the diaphragm at the preselected setting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 6 diagrammatically illustrates operation of the structure of FIGS. 4 and 5.

With the structure of the invention it is possible to use interchangeable objectives of different focal lengths and different aperture ratios with the same camera. The objective assembly of the invention includes a means for preselecting a diaphragm setting, this latter means being permanently connected to the camera housing, and the objective assembly of the invention also includes a diaphragm and a structure for setting the latter, the diaphragm and the diaphragm setting structure forming part of the removable objective assembly which is exchanged for another objective of different focal length. The optical components of the embodiment of FIGS. 1 and 2 are not illustrated for the sake of clarity.

Figure 1:
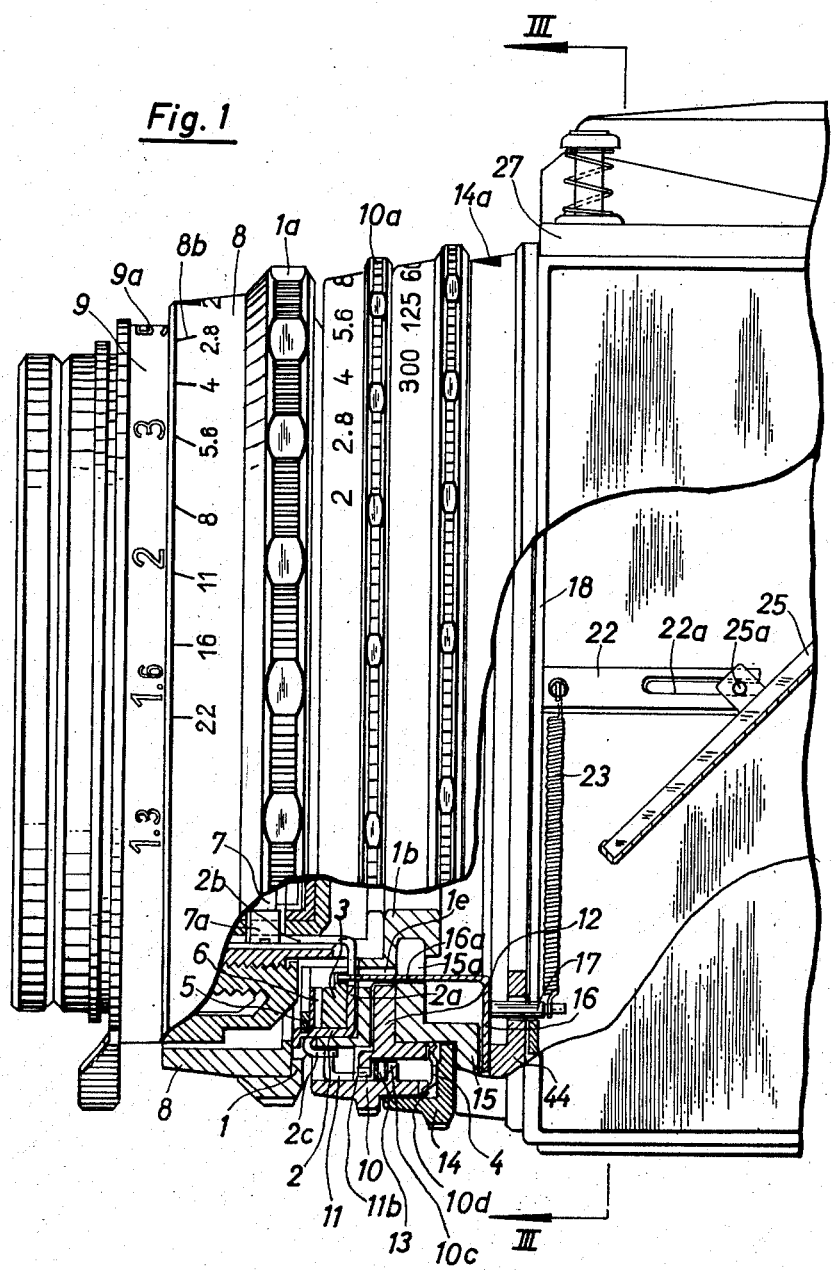
FIG. 1 is a partly sectional side elevational view of the front part of a camera housing and an objective assembly carried thereby.
Figure 2:
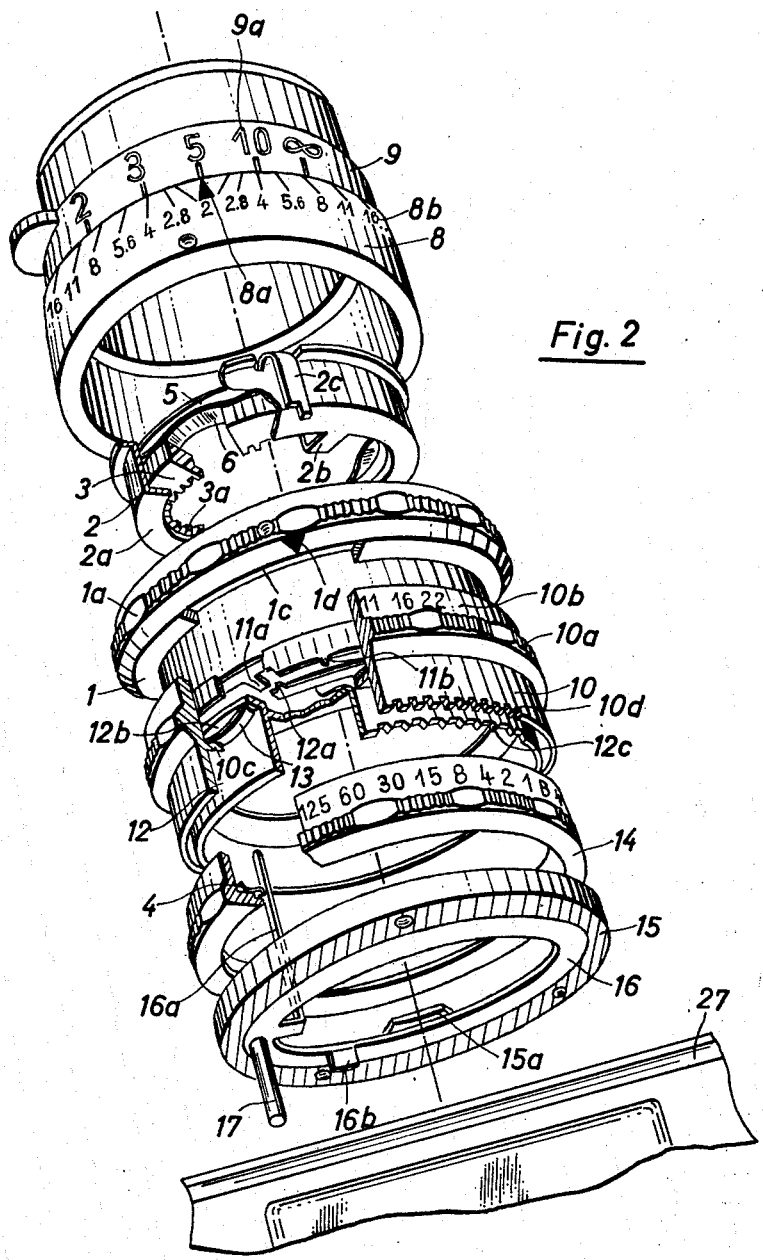
FIG. 2 is an exploded perspective view of the components of the objective assembly of FIG. 1.

Referring now to FIGS. 1 and 2, it will be seen that the structure illustrated therein includes a bayonet ring 1 having an outer peripheral portion 1a which is to be grasped by the operator and including bayonet projections 1b, this annular bayonet ring 1 housing in its interior a diaphragm engaging means 2 which engages the diaphragm to set the letter, as will be apparent from the description below. As may be seen from FIG. 2, in particular, the diaphragm engaging means 2 is annular and includes a cylindrical portion provided at its front end with an outwardly directed annular flange and at its rear end with an inwardly directed annular flange, the latter flange being indicated at 2a. Thus, the latter flange 2a extends inwardly toward the optical axis. Within the annular, rotary diaphragm engaging means 2 is located a friction means 3 which is annular and coaxial with the diaphragm engaging means 2 and which frictionally cooperates with the latter to turn the same around the optical axis. The friction means 3 is in the form of a friction ring which is axially shiftable within the ring 2 toward and away from the flange 2a thereof. At its inner periphery which extends beyond the inner periphery of the flange 2a, the ring 3 is provided with teeth 3a. It will be seen that the rotary member 2 carries a snap ring 5 which serves to limit the movement of an annular corrugated spring 6 away from the flange 2a, this spring 6 engaging the friction ring 3 to urge the latter axially into engagement with the flange 2a, so that the spring 6 forms a spring means cooperating with the friction means 3 and the diaphragm engaging means 2 in order to maintain these parts in frictional, motion-transmitting engagement with each other. The diaphragm engaging means 2 includes a projection 2b which extends radially inwardly from the flange 2a for relatively short distance and then is bent so that it extends parallel to the optical axis, this portion 2b of the diaphragm engaging means extending into direct engagement with a pin 7a (FIG. 1) of the diaphragm 7 which is housed within and forms part of the objective assembly of FIG. 1, so that the pin 7a will turn when the extension 2b turns in order to set the diaphragm in a known way. Furthermore, it will be seen that the diaphragm engaging means 2 is provided at its outer front flange with an additional projection 2c extending parallel to the optical axis rearwardly from this front, outwardly directed flange, and this projection 2c extends through an arcuate slot 1c formed in the bayonet ring 1.

An index ring 8 is non-rotatably fixed to the bayonet ring 1 and carries an index 8a which cooperates with the scale 9a of the focusing ring 9 so that the objective can be set for given distances between the subject and the camera. Furthermore, the ring 8 carries the diaphragm aperture indicia 8b which can be used in order to provide an indication of the depth of field, so that the ring 8 together with the aperture scale 8b forms a depth of field indicator.

The objective assembly of FIGS. 1 and 2 includes a preselecting means for preselecting the diaphragm setting, and this preselecting means includes an annular preselecting ring 10 which is turnable about the optical axis. This ring 10 has an exterior portion 10a capable of being conveniently grasped by the operator for turning the ring 10, and it includes an aperture scale 10b which cooperates with the index 1d (FIG. 2) carried by the bayonet ring 1. A stop ring 11 is fixedly carried by the preselecting ring 10 coaxially therewith, and this stop ring 11 is provided with a radial projection 11a extending radially toward the optical axis and cooperating with the portion 2c of the diaphragm engaging means 2 so as to properly set the diaphragm, as will be apparent from the description which follows. The ring 11 in addition includes an axial projection 11b which extends rearwardly in a direction parallel to the optical axis, and this projection 11b cooperates with a stop 12a of a stationary ring 12, the stop projection 12a extending radially away from the optical axis into the path of turning of the projection 11b, so that the stop 12a limits the turning of the ring 11 and preselector ring 10 therewith in one direction. At its rear end which is directed toward the camera housing, the ring 12 is provided with detent teeth 12c. It will be noted that the projection 12a extends radially from the outer periphery of an outwardly directed annular flange at the front end of the cylindrical ring 12. This flange engages at its rear face which is directed toward the camera housing an annular corrugated spring 13. This spring 13 is located between the latter front flange of the ring 12 and an inwardly directed annular flange 10c of the preselecting ring 10, so that the latter ring is yieldably shiftable along the optical axis. The preselecting ring 10 is provided at its rear periphery with teeth 10d, and a leaf spring 4 extends into the space between a pair of the teeth 10d. This leaf spring 4 is fixedly carried by an exposure time setting means which includes the rotary manually turnable ring 14 which directly carries the leaf spring 4, the latter being fixed to the ring 14 in the manner shown most clearly in FIGS. 1 and 2. Thus, the spring 4 acts as a coupling means for coupling the preselecting ring 10 to the exposure time setting ring 14 so that these rings will turn together. The end of the spring 4 which is distant from the teeth 10d cooperates with the detent teeth 12c of the stationary ring 12 so that the teeth 12c cooperate with the spring 4 to provide predetermined settings of the exposure time setting ring 14.

The ring 14 is carried and guided for turning movement by an annular connecting ring 15 which is screwed onto the camera housing and permanently fastened thereto. It will be seen that this ring 15 also fixedly carries the stationary ring 12. Furthermore, it is the ring 15 which is provided with the bayonet projections 15a which cooperate with the bayonet projections 1b of the bayonet ring 1 for removably fixing the front removable section of the objective assembly to the rear section of the objective assembly which is permanently connected with the camera, this rear section including the preselecting ring 10 as well as the exposure time setting ring 14 and of course the stationary rings 12 and 15. Thus, the front removable section of the objective assembly includes the diaphragm 7 as well as the diaphragm engaging means 2 and the friction means 3 which moves the diaphragm engaging means 2 in a manner described in greater detail below.

The ring 15 is directly in engagement with the front wall 44 of the camera housing at only the outer peripheral portion of the rear face of the ring 15. Inwardly of this outer peripheral portion, the rear face of the ring 15 is spaced in advance of the front surface of the wall 44 to provide an annular groove in which a drive ring 16 is accommodated for turning movement around the optical axis. This drive ring 16 is fixedly connected with a drive pin 17 which extends parallel to the optical axis and which extends through an arcuate slot of the front wall 44, this latter slot being long enough to provide the desired range of movement of the ring 16. This ring 16 also has fixedly connected thereto, as by being formed integrally therewith, an elongated operating projection 16a which extends parallel to the optical axis forwardly from the ring 16 along the interior of the objective assembly into engagement with the teeth 3a of the friction ring 3. Thus, when the removable front section of the objective assembly is mounted on the permanent rear section thereof, by connection of the bayonet ring 1 with the projections 15a of the ring 15, the front end of the portion 16a of the drive ring 16 will enter into the space between a pair of teeth of the friction ring 3. The free end of the portion 16a of the drive ring 16 which is distant from the ring is suitably tapered so as to be substantially pointed and thus enters smoothly into the space between a pair of teeth of the friction ring 3. Furthermore, the bayonet ring 1 is formed with an arcuate slot 1e through which the element 16a can freely pass into engagement with the friction ring 3, and this slot 1e has an angular length greater than the angle through which the pin 7a turns from the largest to the smallest setting of the diaphragm plus the angle of turning of the bayonet ring 1 with respect to the ring 15 in order to fix the bayonet ring 1 to the ring 15.

The exposure time setting ring 14 is provided with a suitable scale cooperating with a stationary index 14a carried by the stationary ring 15.

The pin 17 which is fixed to and extends rearwardly from the drive ring 16 into the interior of the camera housing serves to transmit a drive from the interior of the camera housing to those parts of the objective assembly which set the diaphragm.

Figure 3:
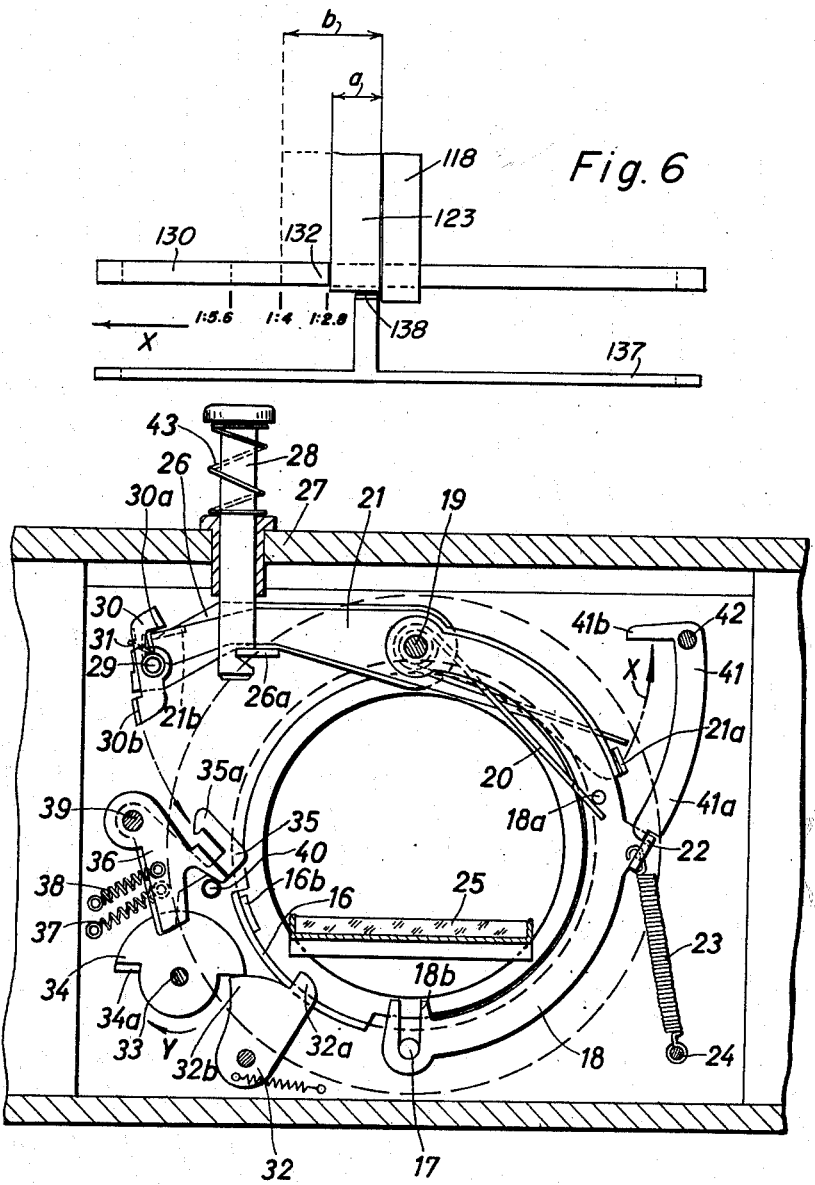
FIG. 3 is a transverse sectional view taken along line III—III of FIG. 1 in the direction of the arrows.

The drive which is in the interior of the camera housing is shown in part in FIG. 1 and in much greater detail in FIG. 3. This drive includes an arcuate driving lever 18 which is turnably carried by a stationary pivot pin 19 which is in turn fixed to a stationary wall in the interior of the camera housing. The swingable drive lever 18 is provided with a projection 18a fixed thereto, and a free end portion of a drive spring 20 engages the projection 18a. This drive spring 20 has an intermediate portion coiled around the stationary pivot pin 19, and the other end of the drive spring 20 engages a projection 21a of a tensioning lever 21 which is also turnably carried by the pivot pin 19 which extends through an intermediate part of the tensioning lever 21 so that the latter is a two-armed lever. The drive lever 18 fixedly carries an elongated extension 22 which extends parallel to the optical axis, and this extension 22 is formed with an opening which serves to connect to the extension 22 a return spring 23 which is relatively weak and which has its end distant from the extension 22 connected to a stationary pin 24 fixedly carried by a wall of the camera housing. This elongated extension 22 is formed with an elongated slot 22a into which an elongated pin 25a extends, this pin 25a being fixed to the tiltable reflector 25 which serves to reflect the image of the subject up to the view finder of the camera, in a well known manner. Thus, the slot 22a and the pin 25a form a pin and slot connection between the tiltable reflector 25 and the drive lever 18.

The end of the drive lever 18 which is distant from the pin 19 is formed with an elongated notch 18b which in effect is an elongated slot open at one end, and the drive pin 17 extends into this notch, so that the notch 18b and the pin 17 form a pin and slot connection between the drive lever 18 and the drive ring 16.

The pivot pin 19 also pivotally supports a control lever 26 located behind the tensioning lever 21, as viewed in FIG. 3, and this lever 26 has a projection 26a formed integrally therewith and extending beneath the tensioning lever 21 into a notch of the release plunger 28 which is actuated by the operator in order to make an exposure. This release plunger 28 is guided by the camera housing 27 for vertical, axial reciprocating movement.

The control lever 26 carries at its left free end, as viewed in FIG. 3, a catch 30 which is pivotally supported intermediate its ends on a pivot pin 29 carried by the control lever 26. This catch 30 is urged to turn in a clockwise direction, as viewed in FIG. 3, by a wire spring 31 coiled in part around the pin 29 and having free ends engaging the lever 26 and the catch 30 to urge the latter in a clockwise direction. This catch 30 has a pair of opposed catch portions at its opposite ends. Thus, it will be seen that the catch 30 has at its top end a catch portion 30a extending over a projection 21b integral with and extending from the tensioning lever 21. At its opposite end the catch 30 is provided with a projection 30b for a purpose described below.

In order to release the shutter so as to make an exposure, the drive ring 16 is provided with a projection 16b extending from the ring 16 rearwardly into the interior of the camera housing. A release pawl 32 is pivotally supported in the interior of the housing and has a projection 32a located in the path of turning movement of the projection 16b when the ring 16 turns, so that the projection 16b turns the pawl 32 in a clockwise direction, as viewed in FIG. 3, to a release position where this pawl releases the wheel 34. Thus, it will be seen that the pawl 32 is provided with a second projection 32b which cooperates with the wheel 34 to prevent the latter from turning in the direction of the arrow Y in the position of the parts shown in FIG. 3. This wheel 34 is carried by a shaft 33 which is a drive shaft of the shutter which is not illustrated, the shutter being well known, and the manner in which it is driven upon rotation of the shaft 33 also being well known. Of course, before an exposure is made the shutter is cocked, and therefore the shaft 33 is released to turn in the direction of the arrow Y as soon as the portion 32b of the pawl 32 moves away from the wheel 34 so as to release the shutter in order to make an exposure. Of course, the wheel 34 necessarily turns during operation of and in conjunction with the shutter. A spring cooperates with the pawl 32 to urge the latter in a counterclockwise direction, and when projection 16b engages projection 32a during turning of the ring 16 in a counterclockwise direction the pawl 32 is turned in a clockwise direction, as viewed in FIG. 3, in opposition to the spring which urges the pawl 32 toward the wheel 34.

The wheel 34 is provided with an axial projection 34a which during turning of the wheel 34 in the direction of the arrow Y will move into engagement with a hook 35 and a release plate 36 which are mounted on a common stationary pivot pin 39. The elements 35 and 36 are respectively urged by springs 37 and 38 in a clockwise direction around the pivot pin 39 into engagement with the stop 40 which is in the form of a stationary pin fixedly carried by a wall of the camera housing, so that the stop 40 determines the rest positions of the parts 35 and 36. The hook 35 is provided with a hook portion 35a which is positioned in the path of turning movement of the catch portion 30b in such a way that the latter will move past the tip of the hook portion 35a advancing the hook 35 slightly in a counterclockwise direction until the hook 35 snaps back over the catch portion 30b in order to retain the latter and the levers 26 and 21 therewith.

The structure illustrated in FIG. 3 also includes a release lever 41 in the form of a bell crank turnably carried by a stationary pivot pin 42 and having an arm 41a provided with a stepped free end engaging the extension 22 of the drive lever 18 to prevent the latter from turning in a counterclockwise direction around the pivot pin 19 during tensioning of the spring 20. The release lever 41 also includes an arm 41b located in the path X of turning movement of the projection 21a of the tensioning lever 21.

The above-described structure of the invention operates in the following manner:

Assuming that the plunger 28 is manually depressed when the parts have the rest position illustrated in FIG. 3, in order to make an exposure, then by reason of the location of the projection 26a in the notch of the plunger 28, the control lever 26 will turn in a counterclockwise direction downwardly around the pin 19, as viewed in FIG. 3. Inasmuch as the catch portion 30a extends over the portion 21b of the tensioning lever 21, the latter necessarily turns at this time with the control lever 26. As a result the projection 21a of the tensioning lever turns along the path X, and moves the free end of the drive spring 20 distant from that end thereof which engages the projection 18a upwardly, as viewed in FIG. 3, so as to tension the drive spring, and when tensioned, this drive spring will be considerably stronger than the relatively weak return spring 23. Thus, at this time the free ends of the spring 20 will be moved apart from each other in order to tension the spring, and when the spring is fully tensioned the projection 21a of the tensioning lever 21 will engage the arm 41b of the bell crank 41 in order to turn the latter in a clockwise direction, as viewed in FIG. 3, so as to move the arm 41a away from the extension 22 of the drive lever 18 so as to release the latter to the force of the tensioned drive spring 20. Therefore, at the moment when the bell crank 41 is turned to release the lever 18, the latter will be moved by the spring 20 in a counterclockwise direction around the pin 19, and as a result of the pin and slot connection between the lever 18 and the ring 16, the latter will be turned in a counterclockwise direction, as viewed in FIG. 3, at this time. In this way the drive ring 16 is driven so as to turn around the optical axis, and of course, the extension 16a of the drive ring will immediately turn the friction ring 3 so as to turn the rotary diaphragm engaging means 2 in order to immediately set the diaphragm. At the same time, the turning of the lever 18 causes the reflector 25 to be turned out of the path of movement of the light rays to the focal plane through the objective.

During the tensioning of the spring 20 by the lever 21, the latter lever together with the control lever 26 are turned through a distance sufficient to cause the catch portion 30b to be engaged and held by the hook portion 35a of the turnable hook 35.

When the drive ring 16 has almost reached the end of its movement in a counterclockwise direction beyond the rest position thereof shown in FIG. 3, the projection 16b thereof will engage the projection 32a of the release pawl 32 so as to move the projection 32b of this pawl away from the wheel 34 and thus release the shutter for operation. Inasmuch as this action takes place just before the end of the movement of the ring 16, the diaphragm will have already been placed in the preselected aperture position thereof, just before the exposure is actually made. Thus, the wheel 34 is released and is turned by the cocked spring of the shutter so that the wheel now turns in the direction of the arrow Y of FIG. 3, and when the exposure has been completed the projection 34a of the wheel 34 will be located closely adjacent to the elements 35, 36 so as to engage the latter. The wheel 34 simply turns at all times in the direction of the arrow Y through a complete revolution back to the rest position thereof shown in FIG. 3. During the time that the projection 34a engages the elements 35 and 36, these elements are turned in opposition to the springs 37 and 38, respectively, so that the hook 35a moves away from the catch portion 30b, and so that the lever 36 engages the catch portion 30b to turn the catch 30 in opposition to the spring 31 in a counterclockwise direction, as viewed in FIG. 3, to a position where the upper catch portion 30a of FIG. 3 is no longer over the portion 21b of the lever 21 so that the latter can now return to its rest position independently of the control lever 26. In this way all of the tension in the spring 20 is released, and the drive lever 18 is automatically returned at this instant to its rest position by the return spring 23. As a result of the pin and slot connection 22a, 25a, between the tiltable reflector 25 and the lever 18, this reflector is automatically returned at this instant to the position where it will reflect the image of the subject up to the view finder.

With this construction, a reliable operation is provided even with relatively long exposure times in those cases when the plunger 28 is very kuickly actuated and released by the operator before the exposure time has elapsed. In this event the hook 35 holds the catch 30 as well as the levers 26 and 21 in their operating position independently of actuation of the plunger 28 by the operator even after the latter is released by the operator until the exposure is completed, and immediately after the exposure is completed the elements 35 and 36 are turned by the projection 34a of the wheel 34 to release the levers 26 and 21 for return movement to their rest position, as described above. On the other hand, when the exposure time is extremely short, the above-described structure will automatically return all parts except the control lever 26 back to their rest position after a relatively short exposure time has elapsed even though the operator still holds the plunger 28 in its depressed position. Thus, assuming that the operator holds the plunger 28 in its depressed position and the exposure has been completed so that the projection 34a engages the elements 35 and 36, it will be seen that while the catch portion 30b will be maintained by the operator in its depressed position, nevertheless the release lever 36 will be turned by the projection 34a through an angle sufficient to turn the catch 30 in opposition to the spring 31 to release the tensioning lever 21 so that all of the parts will return to their rest position with the exception of the control lever 26 and the catch 30. Of course, the turning of the elements 35 and 36 through an angle sufficient to permit the projection 34a to move beyond the lower ends of the elements 35 and 36 is prevented by the maintenance by the operator of the catch portion 30b in its depressed position, but this will only mean that the wheel 34 will stop turning until the operator releases the plunger 28 so that the latter can be acted upon by the spring 43 shown in FIG. 3 to be raised to its rest position, and then the wheel 34 continues to turn so as to continue the turning of the elements 35 and 36 through the rest of their range of turning movement releasing the catch 30 so that the plunger 28 and the control lever 26 can return to their rest position under the influence of the spring 43, and the wheel 34 simply continues around back to the position thereof shown in FIG. 3. During the upward movement of the lever 26, the catch portion 39a simbly rides along the left edge of the projection 21b and snaps over the top of the latter, so that the parts return to the position indicated in FIG. 3. The spring 43 is a relatively weak spring so that the operator has no difficulty in depressing the plunger 28.

With the drive structure described above in connection with FIG. 3, the ring 16 will be turned by the spring 20, drive lever 18, and pin and slot connection 17, 18b, through an angle which is somewhat greater than the angle required to move the diaphragm to its smallest aperture. This movement of the ring 16 is transmitted through the extension 16a thereof through the teeth 3a of the friction ring 3 to the latter, and this friction ring acts as a slip clutch with respect to the diaphragm engaging means 2 to transmit the turning movement of the drive ring 16 to the diaphragm engaging means 2, so that the latter is turned to cause the extension 2b to act on the pin 7a for changing the setting of the diaphragm.

The rotary diaphragm engaging means 2 will continue to turn in this way until the projection 2c thereof engages the stop means 11a whose angular position has been determined according to the preselected position of the ring 10, the latter having been previously set at the desired aperture of the diaphragm. Thus, as soon as the portion 2c of the rotary diaphragm engaging means 2 engages the stop 11a, the rotary engaging means will stop turning and the diaphragm will have been placed in the preselected aperture position, and at this time the continued turning of the drive ring 16 will continue to turn the ring 3 which will simply slip with respect to the diaphragm engaging means 2. Thus, the ring 3 moves with the ring 16 through the entire range of turning movement of the latter, but the extent of movement of the diaphragm engaging means 2 is determined by the position of the stop 11a, and the position of the latter is determined according to the preselection made by actuation of the ring 10. After the exposure, when the ring 16 returns to its rest position, the ring 3 also turns therewith and the turning of the ring 3 is transmitted to the rotary diaphragm engaging means 2, so that the diaphragm is automatically returned to its fully open position after each exposure in order to provide a proper image in the view finder. When the diaphragm reaches its fully open position during return movement of the drive ring 16, the continued turning of the latter will simply cause the friction ring 3 to slip with respect to the diaphragm engaging means 2.

Of course, before an exposure is made the preselecting ring 10 is turned so as to place the desired aperture of the scale 10b opposite the index 1d, and inasmuch as the ring 11 is fixed to the preselecting ring 10, the position of the stop 11a is determined to provide the proper setting of the diaphragm.

When the exposure time is to be set simultaneously with the diaphragm so as to provide a combination of aperture and exposure time which will give a desired total amount of light, the spring 4 acts to couple the preselecting ring 10 with the exposure time setting ring 14. On the other hand, if it is desired to set the diaphragm independently of the exposure time, the ring 10 is simply shifted forwardly along the optical axis in opposition to the spring 13 so as to move the teeth 10d out of mesh with the spring 4 and thus disconnect the preselecting ring 10 from the exposure time setting ring 14, and with the ring 10 held in this forward position uncoupled from the ring 14, the ring 10 is turned to provide a preselected aperture value.

In order to provide a different objective front section, this front section of the objective assembly is turned so as to release the bayonet ring 1 from the ring 15, and then the front lens-carrying section of the objective assembly can quickly and easily be removed by being shifted forwardly along the optical axis and it can be replaced by another objective assembly having different optical characteristics but including the same diaphragm operating structure.

With the above-described structure it is immaterial what type of shutter is used.

Figure 4:
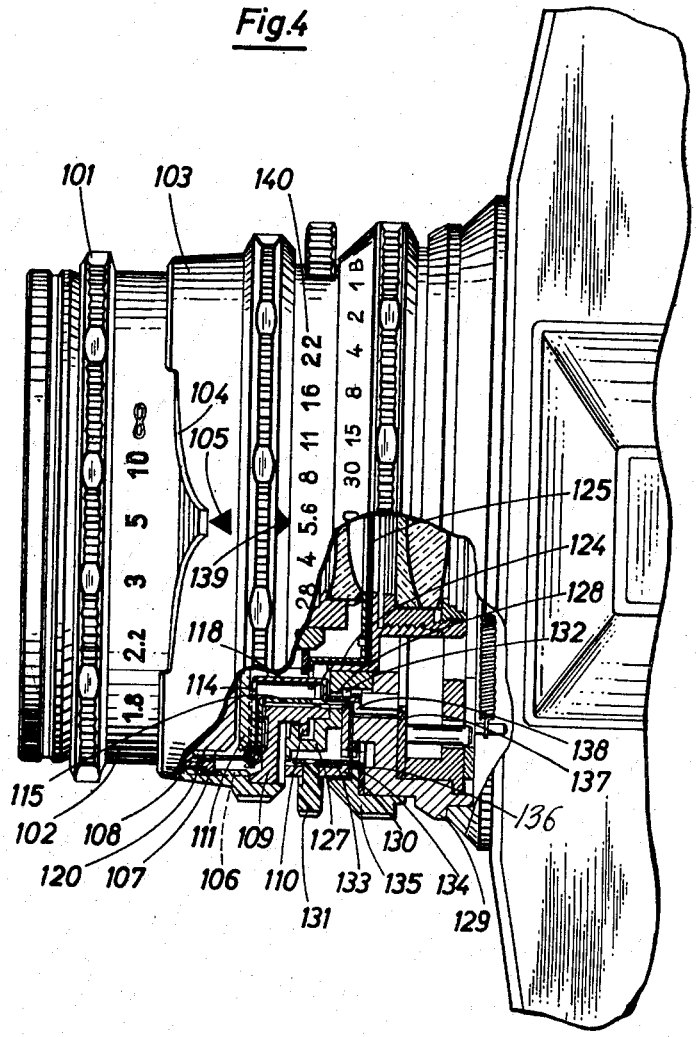
FIG. 4 is a partly sectional side elevational view of another embodiment of an objective assembly according to the present invention.
Figure 5:
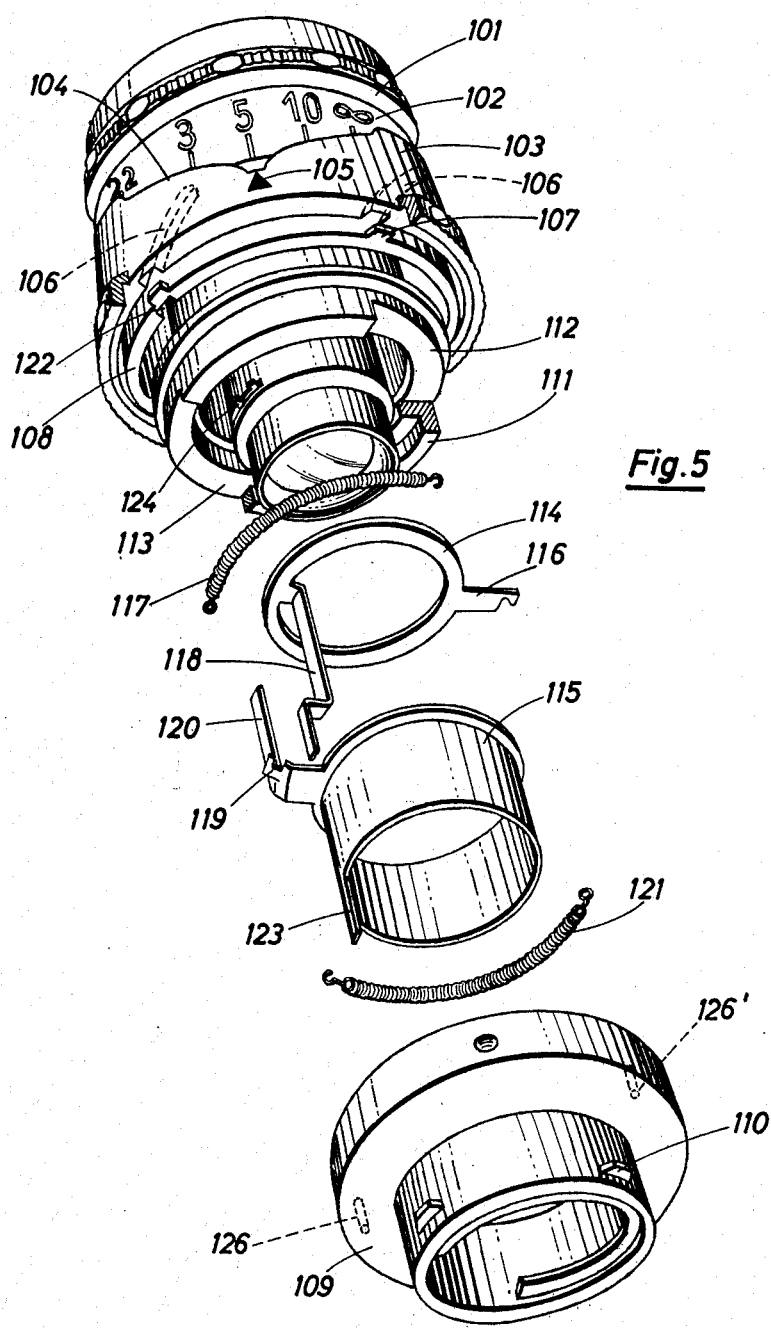
FIG. 5 is an exploded perspective view of the front section of the objective assembly of FIG. 4, this front section being removable from the rear section of the objective assembly which is permanently carried by the camera.

Referring now to the embodiment of the invention which is illustrated in FIGS. 4–6, and referring to FIGS. 4 and 5 in particular, it will be seen that this embodiment of the invention is provided with an objective assembly which has a rotary focusing ring 101 provided with the distance scale 102. This rotary focusing ring 101 extends at its rear end portion which is directed toward the camera housing into a sleeve 103, and it will be noted that the graduations of the scale 102 are overlapped by the sleeve 103. This sleeve 103 is formed at its front peripheral edge with a symmetrical cutout 104 having the configuration shown in FIGS. 4 and 5, and the index 105 which cooperates with the scale 102 is located at the center of symmetry of the cutout 104.

The sleeve 103 is formed at its inner surface with a plurality of helical grooves 106 distributed about the optical axis, and a plurality of pins 107 are respectively slidable in the grooves 106. These pins 107 are fixedly carried by a depth of field indicating ring 108 whose front edge is visible through the cutout 104. Depending upon the position of the ring 108 along the optical axis, the front edge of this latter ring will intersect the edges of the cutout 104 at points where given distances of the scale 102 also intersect the edges of the cutout 104, and the operator need only look at the two points where the front edge of the ring 108 intersect the edge of the cutout 104 to read the distance values of the scale 102 at these intersections in order to directly read the depth of field. Thus, the ring 108 together with the ring 103 and the scale 102 form a depth of field indicating means.

The sleeve 103 is fixedly carried by a bayonet ring 109 having bayonet projections 110 which serve to lock the removable front section of the objective assembly to the rear section of the objective assembly which is permanently carried by the camera. For this purpose the bayonet ring 109 is provided with a knurled exterior surface position, so that it is easy for the operator to connect and disconnect a particular objective to the camera.

In addition to fixedly carrying the sleeve 103, the bayonet ring 109 fixedly carries a ring 111 formed at its rearwardly directed surface which faces the camera housing with a pair of arcuate cutouts 112 and 113 shown most clearly in FIG. 5. The bayonet ring 109 together with the ring 111 fixed thereto form a support for turnably carrying and supporting for turning movement a diaphragm engaging means 114 and of a depth of field indicator actuating means 115.

The diaphragm engaging means 114 is in the form of a flat ring provided with a radial extension 116 adapted to be hooked onto one end of a spring 117, this projection 116 extending through the cutout 112. The ring 111 has a rearwardly directed flange fixed to the ring 109, and this flange surrounds the ring 114, this rearwardly directed flange being interrupted by the pair of opposed cutouts 112 and 113, as evident from FIG. 5. The ring 114 is further provided with an elongated operating portion 118 extending therefrom rearwardly in a direction substantially parallel to the optical axis, this extension 118 being stepped as illustrated in FIG. 5. An intermediate portion of the elongated member 118 is embraced by the bifurcated end of a diaphragm element 124 which turns to set the diaphragm, so that the turning of the ring 114 together with the elongated operating portion 118 thereof will cause the element 124 to turn in order to set the diaphragm. It will be noted particularly from FIG. 5 that the bifurcated free end of element 124 extends through a suitable arcuate slot of the diaphragm housing. Thus, the ring 114 together with its elongated operating portion 118 forms the diaphragm engaging means of the embodiment of FIGS. 4–6, this diaphragm engaging means cooperating with the diaphragm to set the latter. FIG. 4 shows the diaphragm leaves 125, in a diagrammatic manner, these leaves being turned with respect to each other upon turning of element 124 so as to set the diaphragm at a desired aperture.

The actuating means 115 which actuates the depth of field indicator has a front outwardly directed flange located just to the rear of the ring 114 in the space between the rings 109 and 111 inwardly of the rear flange of the ring 111 which is fixed to the ring 109, so that this rear flange also serves to form a support for the actuating means 115. The front flange of the sleeve which forms the actuating means 115 is provided with a projection 119 adapted to be hooked onto one end of a spring 121, and this projection 119 extends radially through the cutout 113. Also, the actuating means 115 is provided with a forwardly directed extension 120 extending parallel to the optical axis into a cutout 122 of the ring 108, so that turning of the actuating means 115 will result in turning of the ring 108, and the cooperation of the pins 107 with the grooves 106 will cause axial shifting of the ring 108 to enable the front edge thereof to indicate the depth of field in the above-described manner. At its end opposite from the extension 120, the actuating sleeve 115 is provided with an extension 123 also extending to the rear parallel to the optical axis and forming an elongated control portion which operates in a manner described below.

The projections 116 and 119 of the elements 114 and 115 are bent in such a way that they can respectively be connected to the springs 117 and 121 while these springs are located in a common plane. The bayonet ring 109 fixedly carries a pair of diametrically opposed pins 126 and 126′, and the pin 126′ is connected to one end of the spring 121 while the pin 126 is connected to one end of the spring 117, the opposite end of the latter spring being connected to the extension 116 of the ring 114 and the opposite end of the spring 121 being connected to the extension 119 of the sleeve 115. Thus, it will be seen that the springs 117 and 121 urge the elements 114 and 115, respectively, to turn in the same direction. Each of the springs 117 and 121 extends through approximately a semi-circle and as is shown most clearly in FIG. 4 the ring 111 is provided at its front end with a relatively short outwardly directed flange which forms together with the ring 109 an annular groove in which the springs 117 and 121 are accommodated, so that this groove opposes any tendency of the springs to shift axially.

The bayonet projections 110 of the bayonet ring 109 cooperate with bayonet projections of a ring 127 which is permanently fixed to the camera housing, and this ring 127 is formed with an opening through which the elongated control portions 118 and 123 extend, this opening 128 being shown in FIG. 4. The camera includes a stationary objective carrier 129 which is fixed to the camera housing and between this ring-shaped carrier 129 and the ring 127 which is fixed at its innermost rear portion to the innermost forward portion of the ring 129 there is located a preselector ring 130 which forms part of a preselecting means for preselecting the setting of the diaphragm with the embodiment of FIGS. 4–6. It will be noted that the ring 127 is stepped so that it has a plurality of portions of different diameters located one after the other, and thus one of the stepped portions of the ring 127 is spaced forwardly of the front face of the ring 129 to provide a space in which the rear wall of the ring 130 is freely turnable, as is clearly shown in FIG. 4, this ring 130 having a forwardly extending cylindrical flange fixed to the outer periphery of its rear wall. This forwardly extending cylindrical flange of the preselecting ring 130 carries a manually engageable member 131 which extends in part through an opening of the forwardly extending cylindrical flange of the ring 130, and the manually engageable portion 131 by having portions extending through openings of the ring 130 in the manner shown most clearly at the lower part of FIG. 4 is capable of shifting with respect to the ring 130 in a plane normal to the optical axis while at the same time remaining at all times permanently connected with the ring 130. The preselecting ring 130 carries at its outer surface an aperture scale 140, and this scale cooperates with an index 130 carried by the sleeve 103. In the region of the opening 128 of the ring 127 the preselecting ring 130 is provided with a stop projection 132 which forms a stop means determining the actual setting of the diaphragm just before the exposure is made. In other words when the ring 130 is turned to a selected setting of the diaphragm the stop 132 of the ring 130 will be located in a predetermined angular position so as to cause the diaphragm to be set according to the selected aperture. The spring 121 acts on the means 115 which actuates the depth of field indicating means to urge this means 115 in a direction which maintains the elongated control portion 123 of the means 115 in engagement with the stop 132, and the elongated control portion 118 of the diaphragm engaging means 114 is located beside and engages the elongated control portion 123, so that the latter control portion acts as a stop for the control portion 118. The spring 117 acts on the diaphragm engaging means 114 to urge the control portion 118 toward and into engagement with the control portion 123.

A leaf spring 133 extends along an inner surface portion of the forwardly extending cylindrical flange of the preselecting means 130, and this leaf spring 133 is fixed at one end to the radially shiftable member 131 and at its opposite end to the ring 130. The leaf spring 133 is provided along a relatively short angular distance of its right edge, as viewed in FIG. 4, with an extension 134 extending rearwardly through a cutout of the rear wall of the ring 130, and this extension 134 is provided with teeth. These teeth which are located on the right side of the rear wall of the preselecting means 130, as viewed in FIG. 4, cooperate with and mesh with teeth of an annular exposure time adjusting ring 135. Thus, the teeth of the projection 134 of the leaf spring 133 by meshing with the teeth at the inner periphery of the exposure time adjusting ring 135 acts as a coupling means for coupling the aperture preselecting means to the exposure time setting means for turning both of the latter means simultaneously if desired. The ring 135 fixedly carries a springy ring 136 provided at its inner periphery with a tooth capable of snapping into the spaces between a plurality of teeth arranged on the exterior surface of the objective carrier 129 in the path of turning of the inner tooth of the springy ring 136, so that the ring 136 together with the outer teeth of the objective carrier 129 form a detent which enables the exposure time adjusting ring 135 to be located in successive predetermined angular positions spaced from each other by predetermined angular distances.

The ring 136 is also provided with a stop projection which is not illustrated in the drawing and which cooperates with the aperture preselecting ring 130 to limit the turning of the latter so that the angle of turning provided for the ring 130 corresponds to the actual aperture settings which can be chosen.

The objective carrying ring 129 further serves to turnably support a drive ring 137 which is driven in the same way as the drive ring 16 described above. The structure which drives the ring 137 is identical with the structure which drives the ring 16. The drive ring 137 of the embodiment of FIG. 4 is provided with an axially extending projection 138 which acts as a stop for the elongated control portion 118 of the diaphragm engaging means 114, this control portion 118 extending, as viewed in FIG. 4, to the right beyond the end of the elongated control portion 123 into overlapping relationship with the left end of the projection 138, the latter projection being located beyond the free end of the elongated control portion 123. This relationship between elements 118, 123, and 138 is clearly illustrated in FIG. 6. The scale of exposure time is carried by the ring 135 and cooperates with an unillustrated index so that the ring 135 can be set by the operator at a selected exposure time.

The above-described structure of FIGS. 4 and 5 operates in the following manner:

If, after the exposure time setting ring 135 has been set at a selected exposure time, it is desired to select an aperture setting independently of the exposure time, then the manually engageable member 131 is pressed inwardly so as to uncouple the teeth of the projection 134 of the leaf spring 133 from the teeth of the ring 136, and thus the preselecting ring 130 is disconnected from the exposure time setting ring 135. With the member 131 held in this inwardly pressed position where the preselecting ring and exposure time setting ring are uncoupled from each other, the preselecting ring 130 is turned until the desired aperture setting is located opposite the index 139. The parts are illustrated in FIG. 6 in the position where the diaphragm has its largest aperture. When the ring 130 is turned by the operator to a selected aperture this ring 130 will necessarily turn in the direction of the arrow $x$ of FIG. 6 to place the stop 132 at an angular position corresponding to the selected aperture which is necessarily smaller than the largest possible aperture of the diaphragm. The spring 121 will act on the actuating means 115 to cause the elongated control portion 123 to follow the stop 132 and thus immediately upon preselection of the desired aperture the depth of field indicating means will automatically indicate the depth of field. However, at this time the elongated control portion 118 of the diaphragm engaging means 114 will not be able to follow the control portion 123 since the control portion 118 will be held in the position illustrated in FIG. 6 by the stop 138 of the drive ring 137. As is apparent from the above description in connection with ring 16, the ring 137 which corresponds to the ring 16 will not turn until the release plunger is actuated by the operator. Thus, the element 118 and the rest of the diaphragm engaging means 114 therewith will necessarily remain stationary while the aperture is preselected and the depth of field is automatically indicated. When the operator actuates the shutter release plunger to make an exposure, the ring 137 will be driven in the direction of the arrow $x$ of FIG. 6 in the manner described above in connection with the ring 16, and at this time just before the actual exposure is made the spring 117 will turn the diaphragm engaging means 114 to cause the elongated control portion 118 to move into engagement with the elongated control portion 123 so as to locate the diaphragm at the preselected setting, and the stop 138 will simply turn past the free end of the elongated control portion 123 until the ring 137 stops turning. In this way the diaphragm is set at the preselected aperture just before the exposure is made, with the embodiment of FIGS. 4–6. The angle through which the ring 137 and its projection 138 turn at each exposure is the same, and this angle is large enough so that even when the smallest aperture of the diaphragm is selected, the stop 138 will reliably move beyond the largest possible distance through which the elongated control portion 118 can turn, and thus the element 118 will always reliably engage the element 123. Immediately after the exposure is made, the ring 137 returns to its rest position, in the same way that the ring 16 returns to its rest position, and during this turning of the stop 138 in a direction opposite to the direction of the arrow $x$ of FIG. 6, the stop 138 will engage the elongated control portion 118 to turn the latter and the remainder of the diaphragm engaging means 114 back to the position where the diaphragm is automatically placed in the fully open position.

As is apparent from the above description, the structure of FIGS. 4 and 5 is provided with an objective assembly which includes a rear section permanently connected with the camera housing and provided with the exposure time setting ring as well as the aperture preselecting ring, while the objective assembly has a front section which is removably connected to the rear section and which includes the diaphragm as well as the diaphragm engaging means and in the embodiment of FIGS. 4 and 5 the automatically operable depth of field indicating means. Thus, the two embodiments of the invention are similar with respect to the parts of the objective assembly permanently carried by the camera and the parts of the objective assembly removably carried by the camera so that interchangeable objectives may be provided.

Inasmuch as the stop 138 of the drive ring 137 is always located at a predetermined angular position when the ring 137 is in its rest position, the position of the operating portion 118 of the diaphragm engaging means 114 of a particular objective when the diaphragm of the objective assembly is in its fully open position is determined. Of course, at different relative apertures of the diaphragm the stop 132 of the preselecting ring 130 will necessarily be in different angular positions. Thus, as may be seen from FIG. 6, the stop 132 is shown in solid lines at the largest relative aperture 1:2.8, while in dotted lines the position which the stop 132 is in for the relative diaphragm apertures 1:4 and 1:5.6 is illustrated. The several interchangeable objectives which are used with the same camera of course are adapted to have different amounts of light pass therethrough, and thus it is necessary for the stop 132 to be positioned according to the largest aperture ratio of the diaphragm of the particular objective which is to be attached to the camera. The stop 132 can easily be located by the operator at the position giving the largest diaphragm aperture for the particular objective in an automatic manner, according to the present invention, by providing the several interchangeable objectives with elongated control portions 123 which are of different widths. Thus, as may be seen from FIG. 6, the objective which has a control portion 123 with a width $a$ will provide for the diaphragm of the objective a largest aperture which will have the ratio 1:2.8, while another objective which can be attached to the camera will be provided with an elongated control portion 123 having a width $b$, so that with this particular objective the largest relative diaphragm aperture will be 1:4, and in the same way a third objective will be provided with an even wider element 123 so that the stop 132 cannot go beyond the relative aperture 1:5.6. Of course, the relative turning between the bayonet ring 109 and the stationary ring 127 in order to provide the bayonet connection of the interchangeable objective with the camera must be chosen large enough so that even when the objective having the widest control portion 123 is connected to the camera, this objective being adapted to have the least amount of light pass therethrough, the control portion 123 can still be located in engagement with the stop 132 when the preselecting ring is turned to the largest relative aperture for the objective which is adapted to have the most light pass therethrough. When a particular objective is connected to the camera, during the turning of the objective with respect to the camera housing so as to provide the bayonet connection the control portion 123 of the particular objective engages the stop 132 so as to automatically turn the ring 130 to the position which corresponds to the largest diaphragm aperture of the particular objective. The embodiment of FIGS. 4–6 also can be used with any type of shutter. Thus, with both embodiments of the invention it is possible to use a curtain type of shutter located at the focal plane or an iris shutter located between the lenses.

The two embodiments of the invention described above have different advantages with respect to each other and one will be preferred over the other depending upon the desired characteristics of the camera. Thus, the embodiment of FIGS. 1 and 2 has the advantage of driving the diaphragm setting structure from the same drive which is used to control the shutter, and it will be noted that all of the driving structures for the embodiment of FIGS. 1 and 2 is located within the camera housing itself, so that it is unnecessary to provide an objective with a structure which will have to accommodate drive springs or the like. On the other hand, while the embodiment of FIGS. 4–6 includes drive springs, nevertheless this embodiment is preferred where it is important to provide a depth of field indicator of the type shown in FIGS. 4 and 5 and described above. It will be seen that with the embodiment of FIGS. 1 and 2 an entirely different type of depth of field indicator is used. The depth of field indicator of FIGS. 4 and 5 is much simpler for the operator to use since, as was pointed out above, the front edge of the ring 108 will indicate at its intersections with the edges of the cutout 104 and in cooperation with the scale 102 the depth of field in an extremely simple manner. Therefore, where an automatic depth of field indicator of the type shown in FIGS. 4 and 5 is considered important, the embodiment of FIGS. 4–6 is preferred, while where such a depth of field indicator is not of such great importance the embodiment of FIGS. 1 and 2 is preferred, since with this embodiment all of the power for setting the diaphragm is derived from the drive structure carried by the housing of the camera and it is unnecessary to provide the objective with structure which can accommodate drive springs such as the spring 117 described above.

It will be noted that with both embodiments of the invention the part of the objective assembly which is permanently carried by the camera includes the aperture preselecting means as well as the exposure time setting means, and with both embodiments of the invention the operator has the option of coupling the aperture selection means with the exposure time setting means. Also, in both embodiments of the invention the front removable section of the objective assembly carries the diaphragm as well as the diaphragm engaging means which sets the diaphragm, and in both embodiments of the invention this front section of the objective assembly is provided with a depth of field indicator, although the depth of field indicator of FIGS. 4 and 5 is quite different from the depth of field indicator of FIGS. 1 and 2. As was pointed out above, the structure shown in FIG. 3 is common to both embodiments of the invention.

It will be understood that each of the elements described above, or two or more together, may also find a useful application in other types of cameras differing from the types described above.

While the invention has been illustrated and described as embodied in single lens reflex cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing; an objective assembly carried by said camera housing and including a rear section permanently connected with said camera housing and a front section removably connected to said rear section so that said front section of said objective assembly may be exchanged for another front section; a diaphragm and a diaphragm setting means carried by said front section of said objective assembly; depth of field indicating means also carried by said front section of said objective assembly; preselecting means carried by said rear section of said objective assembly for preselecting the setting of the diaphragm, said preselecting means being operatively connected to said depth of field indicating means for actuating the latter to indicate the depth of field corresponding to the diaphragm setting preselected by said preselecting means; drive means operatively connected to said diaphragm setting means for driving the latter to set the diaphragm at the setting preselected by said preselecting means; and shutter actuating means for actuating the shutter of the camera to make an exposure, said shutter actuating means actuating said drive means for driving said diaphragm setting means to the preselected setting just prior to opening of the shutter to make the exposure, whereby the depth of field will be indicated as soon as said preselecting means provides the preselected setting of the diaphragm and before the diaphragm is actually set at the preselected setting.

2. In a camera as recited in claim 1, said preselecting means positioning a stop member at a position corresponding to the preselected diaphragm setting and located in the depth of movement of said diaphragm setting means during movement of the latter by said driving means, so that said stop member of said preselecting means will terminate the driving of said diaphragm setting means by said drive means to set the diaphragm at the preselected setting.

3. In a camera as recited in claim 1, said drive means forming part of said objective assembly and including its own drive which is located in and forms part of the objective assembly, and said shutter actuating means releasing the drive means to the force of its own drive.

4. In a camera as recited in claim 1, said diaphragm setting means being rotary and engaging the diaphragm for setting the latter when said rotary means turns around its axis; stop means located in the path of movement of said rotary means for stopping the turning of the latter so as to set the diaphragm at a setting determined by the position of said stop means, said preselecting means cooperating with said stop means for determining the position thereof so as to preselect the setting of the diaphragm, said drive means including a spring cooperating with said rotary setting means for urging the latter to follow said stop means so as to turn into engagement with the latter; and second stop means cooperating with said rotary setting means for preventing the latter from following said first-mentioned stop means, said shutter actuating means cooperating with said second stop means for turning the latter toward and beyond said first-mentioned stop means so that said rotary setting means moves into engagement with said first-mentioned stop means to set the diaphragm at the preselected setting when said shutter actuating means is set into operation.

5. In a camera as recited in claim 1, stop means for determining the setting of the diaphragm, said stop means determining the extent of movement of said setting means so that the diaphragm is set according to the position of said stop means, said preselecting means cooperating with said stop means for positioning the latter according to a preselected setting of the diaphragm.

6. In a camera as recited in claim 1, said drive means being constituted by a first spring means acting on said diaphragm setting means for moving the same to set the diaphragm; moving means cooperating with said depth of field indicating means for moving the latter to indicate depth of field; second spring means cooperating with said moving means for operating the latter to move said depth of field indicating means; first stop means controlling the position of said moving means so as to control the depth of field indicated by said indicating means, said second spring means maintaining said moving means in engagement with said first stop means so that said moving means follows said first stop means to immediately indicate a depth of field depending upon the position of said first stop means irrespective of the position of the latter, said preselecting means being connected to said first stop means for moving the latter to a predetermined position and said first spring means urging said setting means toward said first stop means; second stop means cooperating with said setting means for preventing said first spring means from moving the latter toward said first stop means so that said second stop means prevents said first spring means and setting means from setting the diaphragm according to the setting selected by said preselecting means, said shutter actuating means being set into operation when an exposure is to be made and cooperating with said second stop means for moving the latter toward and beyond said first stop to release said setting means to said first spring means to be moved to a position which will provide a diaphragm setting according to the position selected by said preselecting means when said shutter actuating means is set into operation for making an exposure.

7. In a camera as recited in claim 1, said diaphragm setting means including an elongated control portion; moving means cooperating with said depth of field indicating means for moving the latter and also including an elongated control portion; stop means engaged by said elongated control portion of said moving means and the latter elongated control portion being engaged by said elongated control portion of said setting means so that the elongated control portion of said moving means serves as a stop for the elongated control portion of said setting means, said preselecting means being connected to said stop means for positioning the latter.

8. In a camera as recited in claim 1, said diaphragm setting means including a first elongated control portion; moving means cooperating with said depth of field indicating means for moving the latter and including a second elongated control portion; stop means positioned by said preselecting means; and a pair of spring means respectively cooperating with said setting means and moving means for acting on the latter to urge said first and second control portions toward said stop means, said drive means being constituted by that one of said pair of spring means which is connected to said setting means.

9. In a camera as recited in claim 8, said moving means and setting means including coaxial annular portions turnable about a common axis and said pair of spring means being located in a common plane normal to said axis and extending along arcs, respectively, of a circle whose center is in said axis.

10. In a camera as recited in claim 1, moving means cooperating with said depth of field indicating means for moving the latter, said moving means including an elongated control portion, said diaphragm setting means also including an elongated control portion located alongside of the elongated control portion of said moving means in one position of the parts, the elongated control portion of said moving means having a width which is characteristic of the particular objective so that different objectives have their moving means provided with elongated control portions of different widths; stop means cooperating with said elongated control portion of said moving means for determining the position of the latter and therefore of said depth of field indicating means, said preselecting means cooperating with said stop means for setting the latter at a position which will determine the setting of the diaphragm as well as which will indicate a particular depth of field, the elongated control portion of said diaphragm setting means engaging the elongated control portion of said moving means so that the diaphragm will be set according to the position of said stop means.

11. In a camera, in combination, drive means for moving a diaphragm to a given position, said drive means including a drive spring which when tensioned will move the drive means from a rest position thereof; a relatively weak return spring cooperating with said drive means for returning the latter to a rest position when said drive spring is not tensioned; manually operable means cooperating with said drive spring for tensioning the latter when an exposure is to be made; a rotary actuating ring for transmitting a drive of the drive means; a turnable lever engaged by said drive spring to be moved by the latter; and pin and slot means interconnecting said lever with said ring.

12. In a camera, in combination, a stationary pivot pin; a drive spring having an intermediate portion coiled around said pivot pin; a drive lever turnable on said pivot pin and having a projection engaged by one end of said drive spring; a tensioning lever also turnable on said pivot pin and having a free end engaged by an opposite end of said drive spring; a release plunger actuated by the operator for making an exposure, said plunger being operatively connected with said tensioning lever for turning the latter around said pivot pin to tension said spring so that the latter will turn said drive lever when the latter is released; a release lever engaging said drive lever to prevent movement of the latter by the tensioned drive spring until said release lever is moved away from said drive lever, said release lever being located in the path of movement of said tensioning lever to be engaged by the latter and moved away from said drive lever when said tensioning lever has tensioned said drive spring so that the drive lever will be released to the latter spring when the latter spring is fully tensioned by said tensioning lever.

References Cited in the file of this patent

UNITED STATES PATENTS

| | | |
|---|---|---|
| 1,887,991 | Cain | Nov. 15, 1932 |
| 2,341,387 | Riddell | Feb. 8, 1944 |
| 2,372,430 | Kals | Mar. 27, 1945 |
| 2,397,915 | Bolsey | Apr. 9, 1946 |
| 2,500,034 | Hodges | Mar. 7, 1950 |
| 2,622,497 | Cornut | Dec. 23, 1952 |
| 2,803,182 | Werner | Aug. 20, 1957 |
| 2,861,506 | Leder et al. | Nov. 25, 1958 |
| 2,878,738 | Uhland | Mar. 24, 1959 |
| 2,925,765 | Gebele | Feb. 23, 1960 |
| 2,947,231 | Gebele | Aug. 2, 1960 |
| 2,965,012 | Schutz | Dec. 20, 1960 |
| 2,967,472 | Gebele | Jan. 10, 1961 |

FOREIGN PATENTS

| | | |
|---|---|---|
| 891,187 | Germany | Sept. 24, 1953 |